(12) United States Patent
Bohmann et al.

(10) Patent No.: US 10,598,141 B2
(45) Date of Patent: Mar. 24, 2020

(54) ELECTROMAGNETIC ACTUATOR, ELECTROMAGNETIC VALVE AND HIGH-PRESSURE FUEL PUMP

(71) Applicant: CONTINENTAL AUTOMOTIVE GMBH, Hannover (DE)

(72) Inventors: Jürgen Bohmann, Furth i. Wald (DE); Stephan Bias, Regensburg (DE); Burhan Dagdelen, Waldenbach (DE); Ahmad Ghassemi Todeshkchooii, Karlsruhe (DE); Andreas Mühlbauer, Bernhardswald (DE)

(73) Assignee: Vitesco Technologies GmbH, Hannover (DE)

( * ) Notice: Subject to any disclaimer, the term of this patent is extended or adjusted under 35 U.S.C. 154(b) by 5 days.

(21) Appl. No.: 15/939,749

(22) Filed: Mar. 29, 2018

(65) Prior Publication Data

US 2018/0223783 A1 Aug. 9, 2018

Related U.S. Application Data

(63) Continuation of application No. PCT/EP2016/071903, filed on Sep. 15, 2016.

(30) Foreign Application Priority Data

Sep. 29, 2015 (DE) .................. 10 2015 218 768

(51) Int. Cl.
*F02M 59/46* (2006.01)
*H01F 7/16* (2006.01)
(Continued)

(52) U.S. Cl.
CPC ...... *F02M 59/466* (2013.01); *F02M 63/0017* (2013.01); *F02M 63/0265* (2013.01);
(Continued)

(58) Field of Classification Search
CPC ............ F02M 59/466; F02M 63/0265; F02M 63/0017; H01F 7/13; H01F 7/081;
(Continued)

(56) References Cited

U.S. PATENT DOCUMENTS 2,407,603 A * 9/1946 Derungs ............... H01F 7/13
335/177
2,407,963 A * 9/1946 Persons ................ H01F 7/13
335/260
(Continued)

FOREIGN PATENT DOCUMENTS

CN 103261663 A 8/2013
DE 19650865 A1 6/1998
(Continued)

OTHER PUBLICATIONS

International Search Report and Written Opinion dated Nov. 24, 2016 from corresponding International Patent Application No. PCT/EP2016/071903.
(Continued)

*Primary Examiner* — John Bastianelli (57) ABSTRACT

An electromagnetic actuator includes an armature which has a stop face, and a pole piece which has a counter stop face, wherein the stop face and the counter stop face in terms of geometry are configured so as to be mutually complementary such that the stop face and the counter stop face in a movement of the armature toward the pole piece engage in one another, displacing a medium which is disposed between the stop face and the counter stop face. An electromagnetic valve may include the electromagnetic actuator, and a high-pressure fuel pump may include the electromagnetic valve.

7 Claims, 7 Drawing Sheets

(51) Int. Cl.
*F16K 31/06* (2006.01)
*H01F 7/08* (2006.01)
*F02M 63/00* (2006.01)
*F02M 63/02* (2006.01)
*H01F 7/13* (2006.01)

(52) U.S. Cl.
CPC ...... *F16K 31/0655* (2013.01); *F16K 31/0675* (2013.01); *F16K 31/0689* (2013.01); *F16K 31/0696* (2013.01); *H01F 7/081* (2013.01); *H01F 7/088* (2013.01); *H01F 7/13* (2013.01); *H01F 7/16* (2013.01); *H01F 7/1607* (2013.01); *H01F 2007/086* (2013.01)

(58) Field of Classification Search
CPC ...... H01F 7/16; H01F 7/088; H01F 2007/086; H01F 7/1607; F16K 31/0675; F16K 31/0655; F16K 31/0696; F16K 31/0689
USPC ..................... 251/129.15; 335/279, 281, 297
See application file for complete search history.

(56) References Cited

U.S. PATENT DOCUMENTS

| | | | | |
|---|---|---|---|---|
| 3,168,242 | A * | 2/1965 | Diener | G05D 23/1906 236/75 |
| 3,381,250 | A * | 4/1968 | Weathers | H01F 7/13 335/255 |
| 3,735,302 | A * | 5/1973 | Eckert | H01F 7/1607 335/262 |
| 3,791,408 | A | 2/1974 | Saitou et al. | |
| 3,805,204 | A * | 4/1974 | Petersen | H01F 7/13 335/255 |
| 4,604,600 | A | 8/1986 | Clark | |
| 4,722,482 | A * | 2/1988 | Jordan | F02M 51/0632 239/585.1 |
| 5,066,980 | A * | 11/1991 | Schweizer | H01F 7/13 335/255 |
| 6,062,531 | A | 5/2000 | Rapp et al. | |
| 7,108,242 | B2 * | 9/2006 | Goossens | B60T 8/363 251/129.15 |
| 7,195,226 | B2 * | 3/2007 | Linkner, Jr. | F16K 31/062 251/129.15 |
| 7,441,746 | B2 * | 10/2008 | Sugiyama | F02M 51/0614 251/129.15 |
| 7,626,288 | B2 * | 12/2009 | Protze | H01F 7/1607 335/209 |
| 8,925,897 | B2 * | 1/2015 | Alaze | F16K 31/0689 251/129.19 |
| 2006/0208563 | A1 | 9/2006 | Krawczyk et al. | |
| 2014/0346382 | A1 | 11/2014 | Scheffel et al. | |
| 2016/0305571 | A1 | 10/2016 | Meisiek et al. | |

FOREIGN PATENT DOCUMENTS

| | | |
|---|---|---|
| DE | 19905176 A1 | 8/2000 |
| DE | 102009046830 A1 | 5/2011 |
| DE | 102010031328 A1 | 1/2012 |
| DE | 102011090006 A1 | 7/2013 |
| DE | 102012214910 A1 | 2/2014 |
| DE | 102012214920 A1 | 2/2014 |
| DE | 102013209672 A1 | 11/2014 |
| DE | 102013219439 A1 | 11/2014 |
| DE | 102013225392 A1 | 6/2015 |
| JP | S5381927 U | 7/1978 |
| JP | S57145875 U | 9/1982 |
| WO | 2012012394 A1 | 1/2012 |

OTHER PUBLICATIONS

German Office Action dated Aug. 9, 2016 for corresponding German Patent Application No. 10 2015 218 768.3.
Chinese First Office Action dated Jun. 3, 2019 for corresponding Chinese Patent Application No. 201680057082.0.
Japanese First Office Action dated Oct. 15, 2018 for corresponding Japanese Patent Application No. 2018-516117.
Japanese Second Office Action dated Feb. 4, 2019 for corresponding Japanese Patent Application No. 2018-516117.
Korean Office Action dated Jun. 19, 2019 for corresponding Korean Patent Application No. 10-2018-7008912.
Japanese Notice of Allowance dated Jul. 8, 2019 for corresponding Japanese Patent Application No. 2018-516117.

* cited by examiner

ELECTROMAGNETIC ACTUATOR, ELECTROMAGNETIC VALVE AND HIGH-PRESSURE FUEL PUMP

CROSS REFERENCE TO RELATED APPLICATIONS

This application is a continuation of International application No. PCT/EP2016/071903, filed Sep. 15, 2016, which claims priority to German application No. 10 2015 218 768.5, filed on Sep. 29, 2015, each of which is hereby incorporated by reference herein in its entirety.

FIELD OF INVENTION

The invention relates to an electromagnetic actuator, to an electromagnetic valve which has such an electromagnetic actuator, and to a high-pressure fuel pump which has such an electromagnetic valve.

BACKGROUND

Electromagnetic actuators and electromagnetic valves which are used as inlet valves for high-pressure fuel pumps within fuel injection systems, for example, are known from DE 10 2011 090 006 A1, for example.

The flow rate of the high-pressure fuel pump at an interface between a low-pressure region and a high-pressure region of a fuel injection system, for example on a high-pressure fuel pump, is regulated by way of a digitally actuated, in particular electromagnetic, valve, for example. This electromagnetic valve is opened or closed, respectively, with the aid of an electromagnet. To this end, the electromagnetic valve has a pole piece and an armature which by way of the electromagnet are moved relative to one another. A defined air gap for the dimensioning of the magnet is present between the armature and the pole piece. In a relative mutual movement of the armature and the pole piece, this gap is overcome such that a stop face that is disposed on the armature and faces the pole piece, and a counter stop face that is disposed on the pole piece and faces the armature is opposite the stop face, impact one another. When the electromagnetic valve is switched on account thereof, oscillations which are emitted as sound by way of the adjacent parts, for example parts of the high-pressure fuel pump, are generated by the impulse which the respective moving part induces in rigid, travel-limiting parts. This is perceived as a disturbing noise. Not only are loud operating noises caused in the mutual impact of the mutually opposite stop face and counter stop face, but the impact can additionally also lead to the mutually impacting faces being damaged, in particular in the case of electromagnetic valves having rapid closing velocities. As a consequence, the service life or the operational life, respectively, of the electromagnetic valves is limited in certain circumstances, and the electromagnetic valves have to be checked or replaced at relatively short intervals.

For example, it is known for the impact of the armature and the pole piece to be reduced by software-based solutions in that the energizing of the electromagnet is prematurely reduced or even switched off, or a counter voltage is applied in order for the armature to be decelerated, respectively.

It is known from DE 10 2012 214 910 A1, for example, to provide a damping layer which damps the impact of the armature and the pole piece.

Additionally, it is known from DE 10 2013 219 439 A1, for example, for the impulse of the impact to be reduced as the armature moves out.

SUMMARY

It is an object of the invention to provide an alternative electromagnetic actuator having a lower noise emission.

It is a further object to provide an electromagnetic valve having such an actuator, and a high-pressure fuel pump having such an electromagnetic valve.

An electromagnetic actuator includes a pole piece and an armature which by means of an electromagnet is movable in the direction of the pole piece. The armature has a stop face that faces the pole piece, and the pole piece has a counter stop face that is opposite the stop face and faces the armature. The stop face and the counter stop face in terms of geometry are configured so as to be mutually complementary such that the stop face and the counter stop face in a movement of the armature in the direction toward the pole piece engage in one another so as to exert a displacement force on a medium which is disposed between the stop face and the counter stop face.

On account of the special configuration of the two faces that in terms of geometry is mutually complementary and the engagement in one another that results therefrom, a medium which is present between the two faces is displaced in an amplified manner when the armature and the pole piece converge. On account of the displacement of the medium, the armature is decelerated prior to the impact, the impulse is damped, the oscillations created are reduced, and the emission of noise is thus also reduced. The impact of the armature and the pole piece is thus regulated not in a software-based manner, but in a hardware-based manner. This is advantageous since an arbitrary electronic actuation system and software may be used for the actuation of the electromagnetic actuator, and it is therefore not usually ensured that the optimal settings for reducing the noise emission are used. However, in the case of an embodiment in terms of hardware, the damping of the impact is independent of the actuating periphery and may be guaranteed at any time. No additional further elements such as damping coatings on the armature or on the pole piece are necessary either.

The stop face has a protrusion that is directed toward the pole piece, and the counter stop face has a recess that is directed away from the armature. Alternatively, however, the counter stop face may have a protrusion that is directed toward the armature, and the stop face may have a recess that is directed away from the pole piece. The protrusion and the recess in this instance are in each case configured such that the two engage precisely in one another and between the stop face and the counter stop face thus configure a displacement region in which the medium is displaced in an amplified manner and thus acts in a damping manner on the armature movement.

The protrusion is particularly disposed so as to be centric on the stop face, or on the counter stop face, respectively. It is furthermore case for the recess to be disposed so as to be centric on the stop face, or on the counter stop face, respectively. On account thereof, the displacement region from which the medium is displaced is created in a centrical manner, while the stop face and the counter stop face, respectively, as has been previously known, run in a planar manner laterally to the displacement region, wherein medium herein also has to be displaced in an outward manner albeit to a lesser extent. The greatest displacement is therefore performed in the center, while the medium which is displaced therefrom flows into the planar region and from there is also displaced toward the outside. Overall, increased damping of the armature movement results as compared to design embodiments with planar, mutually opposite stop and counter stop faces.

In one exemplary embodiment, the protrusion herein is formed so as to be spherical, while the recess is formed so as to be dome shaped, in particular spherically dome shaped. The protrusion and the recess therefore engage in one another in a spherical manner.

The protrusion in an alternative embodiment is formed so as to be cone shaped, wherein the recess is likewise formed so as to be cone shaped.

In one further alternative embodiment, the protrusion has the shape of a double cone, while the recess has a simple conical shape.

In the case of both embodiments in which the protrusion and the recess, respectively, have a cone-shaped and double cone-shaped design embodiment, the cones herein may have identical or dissimilar angles of inclination.

In one further embodiment, the protrusion on the stop face or on the counter stop face is configured as a projecting platform having a planar engagement face that is disposed so as to be parallel with the stop face or with the counter stop face, and having lateral faces that are disposed so as to be substantially perpendicular to the stop face or to the counter stop face. At the same time, the recess on the stop face or on the counter stop face is configured as a recessed platform having a planar receiving face that is disposed so as to be parallel with the stop face or with the counter stop face, and having lateral faces that are disposed so as to be substantially perpendicular to the stop face or to the counter stop face.

All geometries mentioned above have the effect that the medium that is present in a displacement region between the recess and the protrusion is more intensely displaced than between two planar faces, on account of which an amplified damping of the armature movement is achieved. The respective geometries herein on the stop face, that is to say on the armature, and on the counter stop face, that is to say on the pole piece, are interchangeable.

The geometry pairings described above are particularly acceptable; however, combinations of the geometries with one another, or derivatives thereof, are also conceivable. This means that a spherical shape may also interact with a conical shape or with a double conical shape, respectively, or a cone or a double cone, respectively, may interact with a dome shape. It is furthermore also possible to combine a projecting platform with a dome-shaped, cone-shaped or double cone-shaped recess, respectively, or to combine a recessed planar platform with a spherical, conical, or a double conical shaped protrusion.

An electromagnetic valve includes a spring having a spring force, and an electromagnetic actuator as described above, which in operation causes an actuator force that acts counter to the spring force. The electromagnetic valve furthermore has a valve member which is activatable by means of the actuator and has a closing element which for closing the valve interacts with a valve seat. The valve member in relation to the actuator and to the spring is either disposed such that the valve by means of the actuator force may be opened counter to the spring force, or is disposed such that the valve by means of the actuator force may be closed counter to the spring force. The electromagnetic valve may thus be configured as a closed electromagnetic valve when not energized, or as an open electromagnetic valve when not energized.

A high-pressure fuel pump advantageously has an inlet valve for admitting fuel into a pressurized space of the high-pressure fuel pump, wherein the inlet valve is configured as an electromagnetic valve as described above.

BRIEF DESCRIPTION OF THE DRAWINGS

Advantageous configurations of example embodiments will be explained in more detail below by means of the appended drawings. In the drawings.

DETAILED DESCRIPTION

Figure 1:
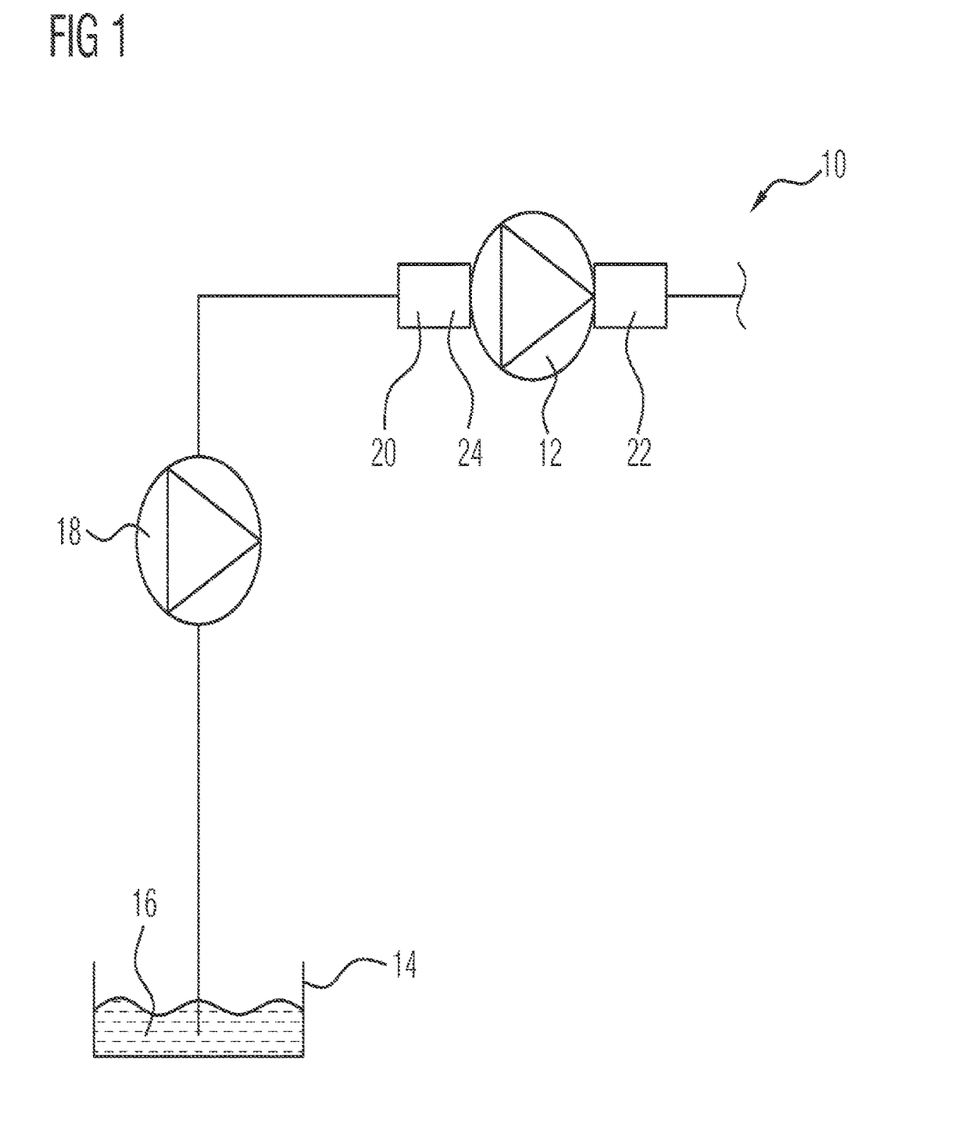
FIG. 1 shows a schematic illustration of a part-region of a fuel injection system having a high-pressure fuel pump and an inlet valve that is disposed on the high-pressure fuel pump.

FIG. 1 shows a schematic illustration of a part-region of a fuel injection system 10 having a high-pressure fuel pump 12. Apart from the high-pressure fuel pump 12, the fuel injection system 10 has a tank 14 for storing a fuel 16, a preliminary pump 18 for impinging the fuel 16 with a preliminary pressure and for conveying the fuel 16 to the high-pressure fuel pump 12, and on the high-pressure fuel pump 16 has an inlet valve 20 which admits fuel 16 into a pressurized space (not shown) of the high-pressure fuel pump 12, or blocks the inlet, respectively. Once the fuel 16 in the high-pressure fuel pump 12 has been impinged with high pressure, the fuel is conveyed onward by way of an outlet valve 22, for example to a rail, and from there to injectors for injecting into combustion chambers of an internal combustion engine.

Figure 7:
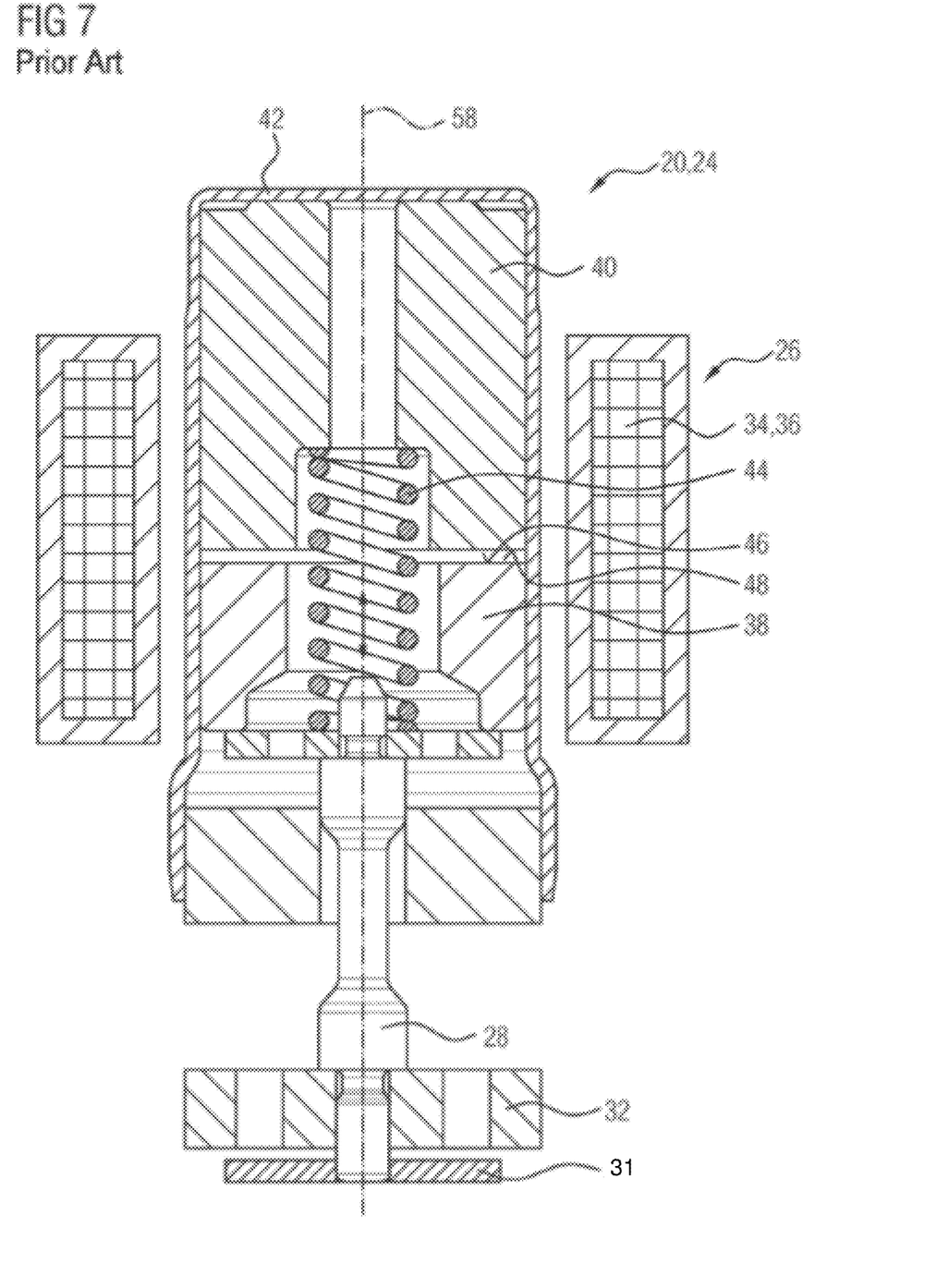
FIG. 7 shows a longitudinal sectional illustration of an inlet valve from the prior art.

The inlet valve 20 on the high-pressure fuel pump 16 may be configured, for example, as an electromagnetic valve 24, the substantial component parts thereof being described hereunder with reference to FIG. 7 which shows an electromagnetic valve 24 from the prior art.

The electromagnetic valve 24 herein has an electromagnetic actuator 26 and a valve member 28 which may be activated by the electromagnetic actuator 26. The valve member 28 interacts with a valve seat 32 such that a closing element 31 of the electromagnetic valve 24 opens in the event of any contact between the valve member 28 and the valve seat 32.

The electromagnetic actuator 26 includes a coil 34 of an electromagnet 36, and an armature 38 and a pole piece 40 which are disposed within a housing 42. The coil 34 herein is disposed around the housing 42.

A spring 44 which in the present embodiment exerts a spring force in the direction toward an open position of the closing element 30 on the armature 38 is disposed between the armature 38 and the pole piece 40. Since the armature 38 and the valve member 28 are fixedly interconnected, the valve member 28 and the closing element 30 disposed on the latter are urged to the open position by the spring force. On account thereof, the closing element 30 on the electromagnetic valve 24 opens.

If the coil 34 is now impinged with a voltage, an electromagnetic field which pulls the armature 38 in the direction toward the pole piece 40 is created. On account thereof, the spring force of the spring 44 is bridged and the armature 38 and the valve member 28 move away from the valve seat 32. The closing of the electromagnetic valve 24 by the closing element 30 is thus enabled.

A stop face 46 which is configured on the armature 38 and faces the pole piece 40, and a counter stop face 48 which faces the armature 38 and is opposite the stop face 46, mutually impact in a movement of the armature 38 toward the pole piece 40, this potentially leading to a high level of noise being developed, in particular by exciting stationary parts in the fuel injection system 10.

It is therefore now proposed that the stop face 46 and the counter stop face 48, instead of the planar stop face 46 and the planar counter stop face 48, respectively, known in the prior art according to FIG. 7, in terms of geometry are to be configured so as to be mutually complementary such that the stop face 46 and the counter stop face 48 engage in one another, wherein a medium which is disposed in a displacement region 50 between the stop face 46 and the counter stop face 48 is displaced from this displacement region 50 and, on account thereof, damping of the armature movement is affected.

Figure 2:
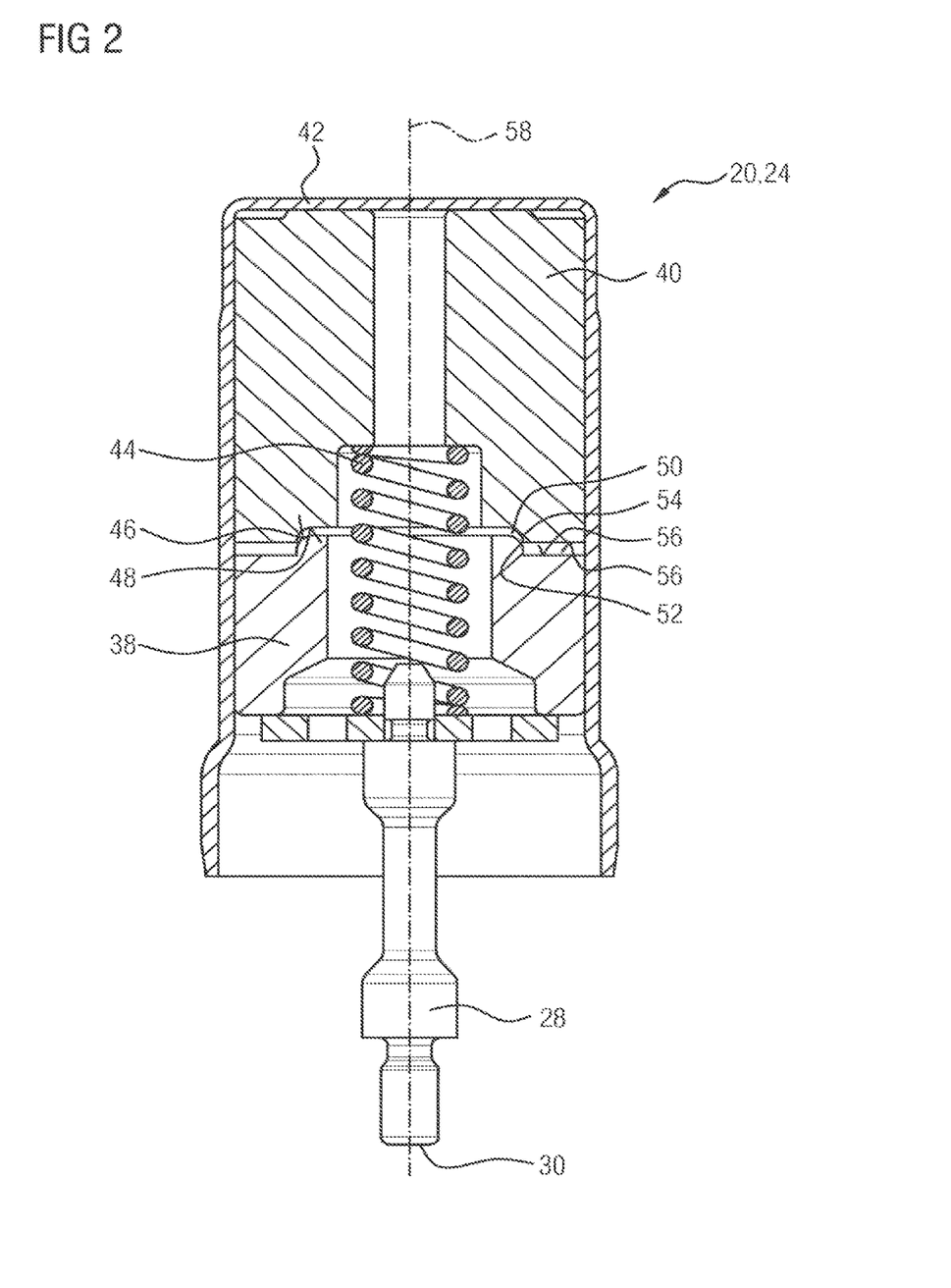
FIG. 2 shows a detailed longitudinal sectional illustration of the inlet valve from FIG. 1, in a first embodiment.

FIG. 2 herein shows a longitudinal sectional illustration of a first embodiment of the electromagnetic valve 24, in which the armature 38 on the stop face 46 thereof has a protrusion 52 that is disposed so as to be directed toward the counter stop face 48. At the same time, the pole piece 40 on the counter stop face 48 thereof has a recess 54 that is directed away from the armature 38. The protrusion 52 and the recess 54 herein engage in one another and in this region in which the two are engaging in one another therefore configure a displacement region 50 from which a medium which is disposed therein, in a movement of the armature 38 toward the pole piece 40, is displaced in an amplified manner.

The protrusion 52 and the recess 54 herein are configured so as to be centric on the stop face 46 and on the counter stop face 48, respectively, such that a planar annular face 56 is configured about the protrusion 52 and the recess 54, respectively. Here too, the medium, in a movement of the armature 38 toward the pole piece 40, is displaced toward the outside, but not as intensely as in the displacement region 50, since the medium is displaced only in one direction, specifically in a radially outward manner, while the medium in the displacement region 50 has to overcome various spatial directions, specifically first a radial direction toward the side and then an axial direction counter to the movement direction of the armature 38, a higher damping effect being effected on account thereof.

Depending on the mutual arrangement of the armature 38, of the pole piece 40, and of the spring 44, the electromagnetic valve 24 is configured as an open valve 24 when not energized, or as a closed valve 24 when not energized. The electromagnetic valve 24 in the present embodiment is configured as a closed valve 24 when not energized. However, a construction mode in which the valve 24 is open when not energized is also conceivable.

The complementary geometric shape of the stop face 46 and of the counter stop face 48 in FIG. 2 is formed by a dome shape of the recess 54 and by a spherical shape of the protrusion 52.

Figure 3:
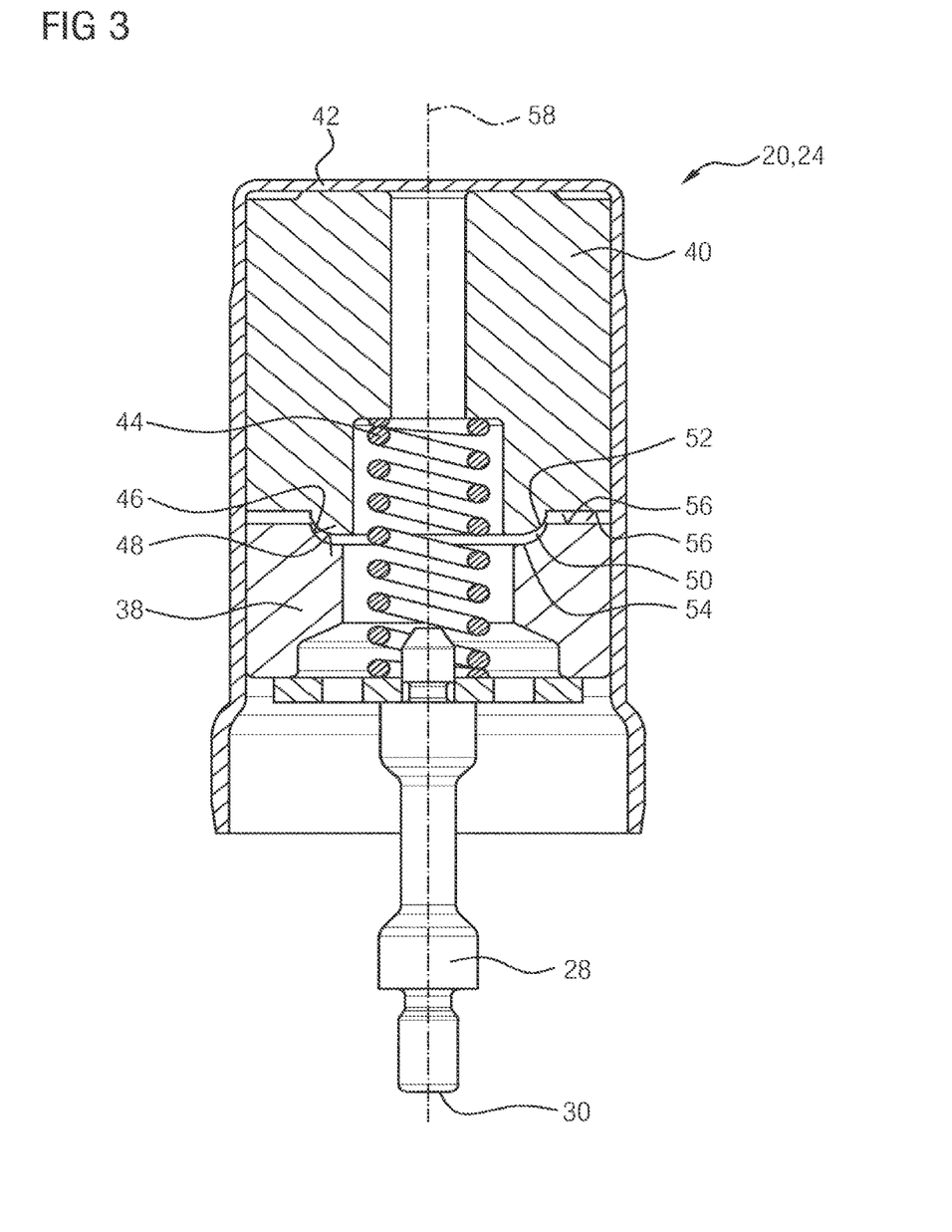
FIG. 3 shows a detailed longitudinal sectional illustration of the inlet valve from FIG. 1, in a second embodiment.

FIG. 3 shows an alternative embodiment in which the protrusion 52 is not disposed on the armature 38 but on the pole piece 40, and the recess 54 is not disposed on the pole piece 40 but on the armature 38, thus in principle the reversed arrangement of that in FIG. 2. Here too, the recess 54 is configured so as to have a dome shape, and the protrusion 52 is configured so as to have a spherical shape. It is an advantage of this embodiment that the mass is lower as compared with that of FIG. 2, and a lower emission of noise may thus result from the lower mass alone.

In the case of the embodiments hereunder, in each case only one version, i.e. the recess 54 being in the armature 38, and the protrusion 52 being in the pole piece 40, is illustrated; however, it is also possible for the recess 54 and the protrusion 52 to be provided in the respective other element.

Figure 4:
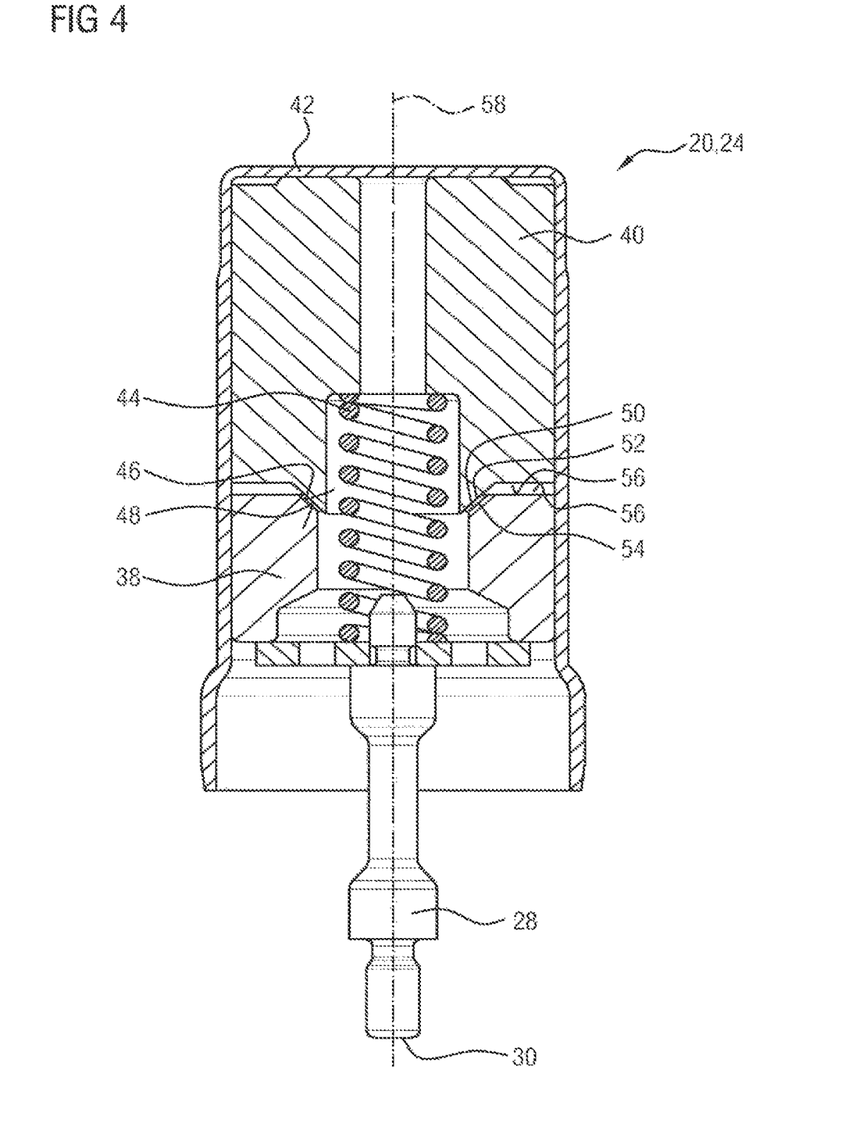
FIG. 4 shows a detailed longitudinal sectional illustration of the inlet valve from FIG. 1, in a third embodiment.

FIG. 4 herein shows an embodiment in which both the recess 54 as well as the protrusion 52 are configured so as to be cone-shaped, wherein the two cones have identical angles of inclination. It would also be conceivable for both cones to be configured with dissimilar angles of inclination.

Figure 5:
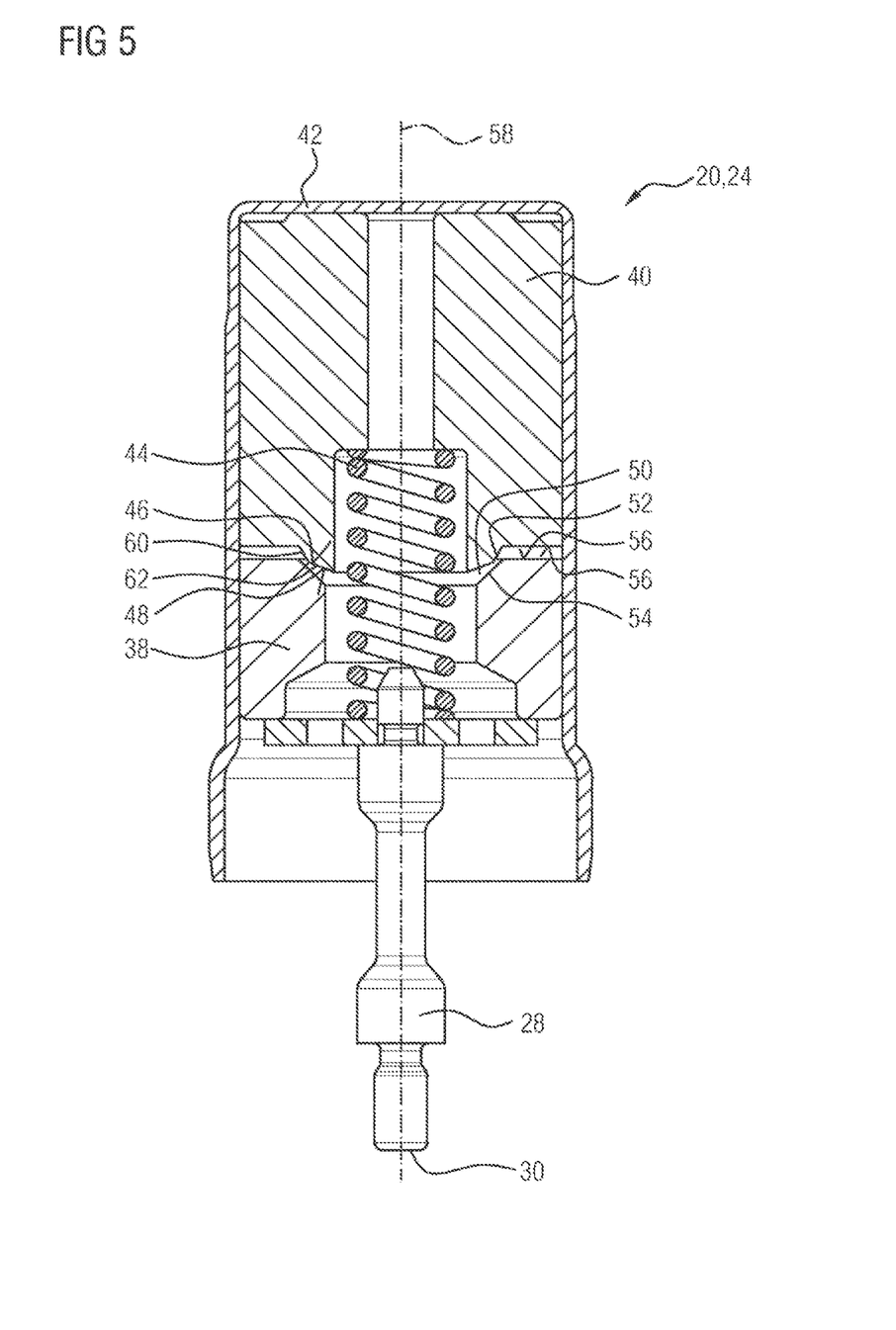
FIG. 5 shows a detailed longitudinal sectional illustration of the inlet valve from FIG. 1, in a fourth embodiment.

FIG. 5 shows an embodiment in which the recess 54 is configured having a simple conical shape, while the protrusion 52 is configured with a double conical shape, that is to say that the protrusion 52 along a longitudinal axis 58 of the electromagnetic valve 24 has a first cone region 60 and a second cone region 62, the cone regions having dissimilar angles of inclination.

Figure 6:
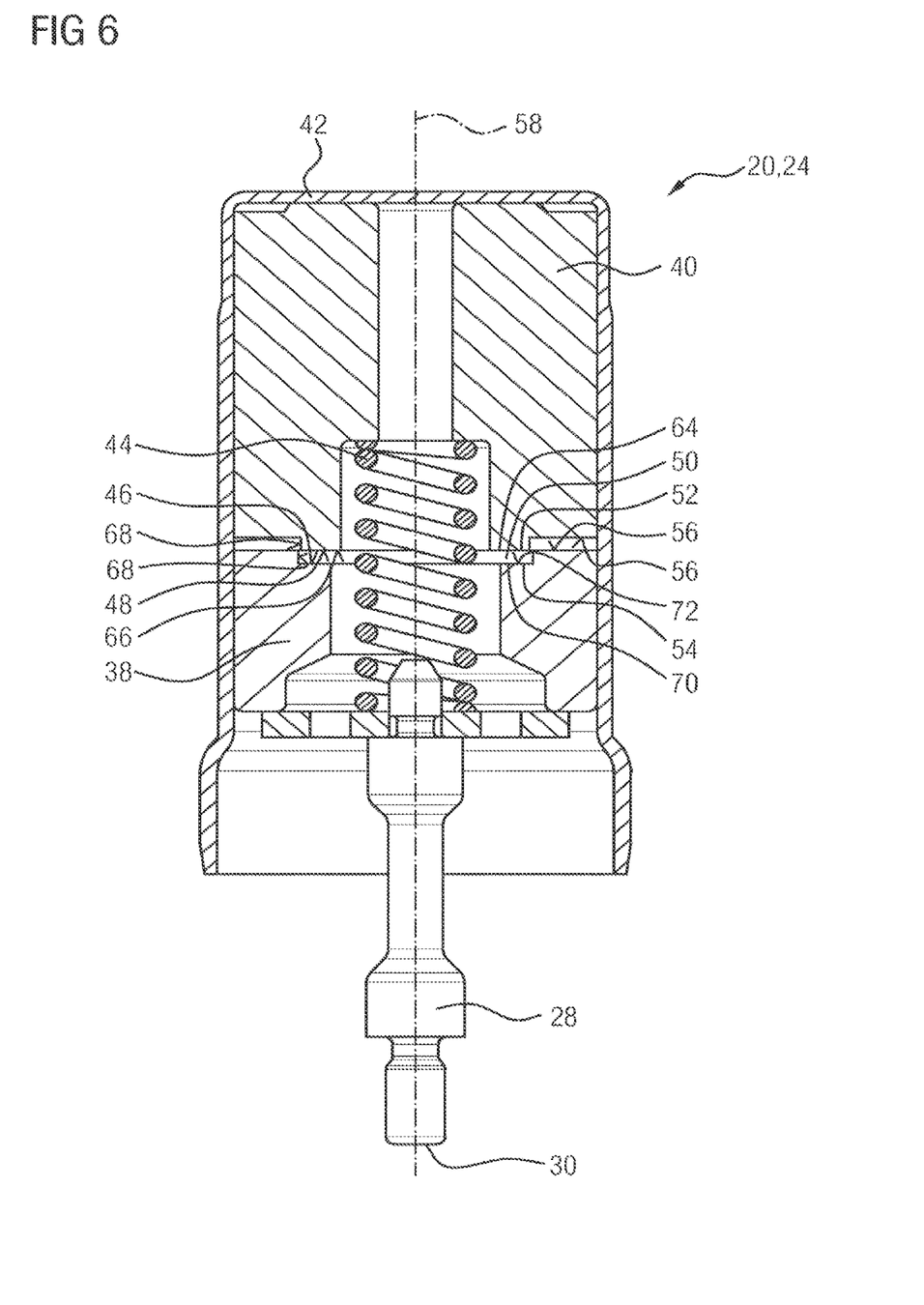
FIG. 6 shows a detailed longitudinal sectional illustration of the inlet valve from FIG. 1, in a fifth embodiment.

FIG. 6 shows further embodiment in which the protrusion 52 and the recess 54 engage in one another by way of a planar geometry, wherein the protrusion 52 is configured as a projecting platform 64 having a planar engagement face 66 and perpendicular lateral faces 68 that are disposed so as to be parallel with the longitudinal axis 58, while the recess 54 is configured as a recessed platform 70 having a planar receiving face 72 and perpendicular lateral faces 68 that are configured so as to be parallel with the longitudinal axis 58.

All geometries which have been described above may be combined with one another. It is also conceivable for derivatives which, for example, have other angles, to be provided.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

The invention claimed is:

1. An electromagnetic actuator comprising:
   a pole piece; and
   an armature which by means of an electromagnet is movable in the direction of the pole piece;
   wherein the armature has a stop face that faces the pole piece, and wherein the pole piece has a counter stop face that is opposite the stop face and faces the armature;
   wherein the stop face and the counter stop face in terms of geometry are configured so as to be mutually complementary such that the stop face and the counter stop face, in a movement of the armature in the direction toward the pole piece, engage in one another so as to exert a displacement force on a medium which is disposed between the stop face and the counter stop face,
   wherein the stop face has a protrusion that is directed toward the pole piece, and the counter stop face has a recess that is directed away from the armature, or the counter stop face has a protrusion that is directed toward the armature, and the stop face has a recess that is directed away from the pole piece, and wherein the protrusion has the shape of a double cone in that the protrusion includes a first cone-shaped region and a second cone-shaped region, wherein the first cone shaped region has an angle of inclination that is different from an angle of inclination of the second cone shaped region, and wherein the recess includes a cone shaped region having an angle of inclination which matches the angle of inclination of one of the first cone region and the second cone region.

2. The electromagnetic actuator as claimed in claim 1, wherein the protrusion is disposed so as to be centric on the one of the stop face and the counter stop face having the protrusion, and the recess is disposed so as to be centric on the one of the stop face and the counter stop face having the recess.

3. The electromagnetic actuator as claimed in claim 1, wherein the electromagnetic actuator is disposed in an electromagnetic valve.

4. The electromagnetic actuator as claimed in claim 3, wherein the electromagnetic valve is disposed in a high pressure fuel pump.

5. An electromagnetic valve having:
a spring having a spring force;
an electromagnetic actuator having an actuator force which in operation acts counter to the spring force; and
a valve member which is activatable by the actuator and has a valve seat and a closing element which for closing the valve interacts with the valve seat;
wherein the valve member in relation to the actuator and to the spring is either disposed such that the valve by the actuator force is selectively opened counter to the spring force, or disposed such that the valve by the actuator force is selectively closed counter to the spring force, and
wherein the electromagnetic actuator comprises:
a pole piece; and
an armature which is movable in the direction of the pole piece;
wherein the armature has a stop face that faces the pole piece, and wherein the pole piece has a counter stop face that is opposite the stop face and faces the armature;
wherein the stop face and the counter stop face are dimensioned so as to be mutually complementary such that the stop face and the counter stop face, in a movement of the armature in the direction toward the pole piece, engage with one another so as to exert a displacement force on a medium which is disposed between the stop face and the counter stop face,
wherein one of the stop face and the counter stop face has a protrusion, and the other one of the stop face and the counter stop face has a recess
wherein the protrusion is centric on the one of the stop face and the counter stop face having the protrusion, and the recess is disposed so as to be centric on the one of the stop face and the counter stop face having the recess, and wherein the protrusion includes a first region that is shaped as at least part of a first cone and second region that is shaped as at least part of a second cone, the first and second cones having different angles of inclination.

6. The electromagnetic valve as claimed in claim 5, wherein the electromagnetic valve is disposed in and is part of a high-pressure fuel pump.

7. A high-pressure fuel pump, comprising:
an inlet valve for admitting fuel into a pressurized space of the high-pressure fuel pump, wherein the inlet valve is an electromagnetic valve and comprises
a spring having a spring force;
an electromagnetic actuator having an actuator force which in operation acts counter to the spring force; and
a valve member which is activatable by the actuator and has a valve seat and a closing element which for closing the valve interacts with the valve seat;
wherein the valve member in relation to the actuator and to the spring is either disposed such that the valve by the actuator force is selectively opened counter to the spring force, or in relation to the actuator and to the spring is disposed such that the valve by the actuator force is selectively closed counter to the spring force, and
wherein the electromagnetic actuator comprises:
a pole piece; and
an armature which is movable in the direction of the pole piece;
wherein the armature has a stop face that faces the pole piece, and wherein the pole piece has a counter stop face that is opposite the stop face and faces the armature;
wherein the stop face and the counter stop face in terms of geometry are configured so as to be mutually complementary such that the stop face and the counter stop face in a movement of the armature in the direction toward the pole piece engage in one another so as to exert a displacement force on a medium which is disposed between the stop face and the counter stop face,
wherein the stop face has a protrusion that is directed toward the pole piece and the counter stop face has a recess that is directed away from the armature, or the counter stop face has a protrusion that is directed toward the armature and the stop face has a recess that is directed away from the pole piece, and
wherein the protrusion has the shape of a double cone in that the protrusion includes a first cone-shaped region and a second cone-shaped region, wherein the first cone shaped region has an angle of inclination that is different from an angle of inclination of the second cone shaped region, and wherein the recess includes a cone shaped region having an angle of inclination which matches the angle of inclination of one of the first cone region and the second cone region.

* * * * *